(12) United States Patent
Ji

(10) Patent No.: US 11,861,232 B2
(45) Date of Patent: Jan. 2, 2024

(54) STORAGE SYSTEM AND DATA WRITING METHOD THEREOF

(71) Applicant: CHANGXIN MEMORY TECHNOLOGIES, INC., Hefei (CN)

(72) Inventor: Kangling Ji, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 19 days.

(21) Appl. No.: 17/657,812

(22) Filed: Apr. 4, 2022

(65) Prior Publication Data

US 2023/0185486 A1 Jun. 15, 2023

(30) Foreign Application Priority Data

Dec. 14, 2021 (CN) .......................... 202111531858.7

(51) Int. Cl.
  *G06F 3/06* (2006.01)
(52) U.S. Cl.
  CPC ............ *G06F 3/0659* (2013.01); *G06F 3/061* (2013.01); *G06F 3/0673* (2013.01)
(58) Field of Classification Search
  CPC ...... G06F 3/061; G06F 3/0659; G06F 3/0673; G06F 3/0625; G06F 13/16; Y02D 10/00
  See application file for complete search history.

(56) References Cited

U.S. PATENT DOCUMENTS

| | | | |
|---|---|---|---|
| 5,438,536 A * | 8/1995 | Salzman | G11C 5/14 365/52 |
| 6,128,654 A | 10/2000 | Runaldue et al. | |
| 8,112,602 B2 | 2/2012 | Li et al. | |
| 9,658,666 B1 * | 5/2017 | Ghayal | H02M 1/0043 |
| 9,678,871 B2 | 6/2017 | Voigt | |
| 10,545,863 B2 | 1/2020 | Kanno et al. | |

(Continued)

FOREIGN PATENT DOCUMENTS

| | | |
|---|---|---|
| CN | 104937564 B | 9/2017 |
| TW | 449694 B | 8/2001 |

(Continued)

OTHER PUBLICATIONS

Non-Final Office Action cited in U.S. Appl. No. 17/657,805, dated Jun. 23, 2023, 28 pages.

(Continued)

*Primary Examiner* — Larry T Mackall
(74) *Attorney, Agent, or Firm* — Cooper Legal Group, LLC

(57) ABSTRACT

Embodiments of the present disclosure relate to the technical field of semiconductors and provide a storage system and a data writing method thereof. The storage system is configured to: enter a write data copy mode in response to a write-copy enable signal; if at least two groups of data in multiple groups of data exported from multiple data ports are a same in the write data copy mode, define the at least two groups of data as a category; generate an identification signal that is used to indicate a data copy; transmit one group of data in the category to an interface of a memory array; and disconnect a transmission path between a data port corresponding to another group of data in the category and another interface of the memory array, wherein the memory array, in response to the write-copy enable signal and the identification signal.

15 Claims, 6 Drawing Sheets

(56) References Cited

U.S. PATENT DOCUMENTS

| | | | |
|---|---|---|---|
| 2017/0255394 A1* | 9/2017 | Suh | G11C 7/1006 |
| 2021/0124699 A1 | 4/2021 | Shimizu | |
| 2021/0357332 A1 | 11/2021 | Dirik et al. | |

FOREIGN PATENT DOCUMENTS

| | | |
|---|---|---|
| TW | I371691 B | 9/2012 |
| TW | I644211 B | 12/2018 |
| TW | 202122993 A | 6/2021 |
| WO | 2021028723 A3 | 2/2021 |

OTHER PUBLICATIONS

TW Office Action cited in TW111127810, dated Apr. 17, 2023, 12 pages.

\* cited by examiner

STORAGE SYSTEM AND DATA WRITING METHOD THEREOF

CROSS-REFERENCE TO RELATED APPLICATIONS

This application claims the priority of Chinese Patent Application No. 202111531858.7, submitted to the Chinese Intellectual Property Office on Dec. 14, 2021, the disclosure of which is incorporated herein in its entirety by reference.

TECHNICAL FIELD

Embodiments of the present disclosure relate to the technical field of semiconductors, and in particular, to a storage system and a data writing method thereof.

BACKGROUND

A storage device is often used to write and read information in a wide range of electronic systems such as a mobile phone, a tablet, a computer, a server, and an electronic system that includes a processor or requires information storage. A storage device can be controlled by using a storage device-based command such as a read command or write command that is received by using a command bus. Information to be stored can be written to a storage device by using a write command, and then read and retrieved from the storage device by using a read command.

Multiple data transmission channels can be concurrently driven to write multiple data entries to a storage device. However, if some of the multiple data entries are the same, more power is required to drive multiple data transmission channels than to drive a single data transmission channel.

SUMMARY

The embodiments of the present disclosure provide a storage system and a data writing method thereof.

According to some embodiments of the present disclosure, one aspect provides a storage system, wherein the storage system is configured to: enter a write data copy mode in response to a write-copy enable signal; if at least two groups of data in multiple groups of data exported from multiple data ports are a same in the write data copy mode, define the at least two groups of data as a category; generate an identification signal that is used to indicate a data copy; transmit one group of data in the category to an interface of a memory array; and disconnect a transmission path between a data port corresponding to another group of data in the category and another interface of the memory array, wherein the memory array, in response to the write-copy enable signal and the identification signal, copies the one group of data in the category to the another interface that is of the memory array and that corresponds to the another group of data in the category.

According to some embodiments of the present disclosure, another aspect provides a data writing method of a storage system, including: entering a write data copy mode in response to a write-copy enable signal; if at least two groups of data in multiple groups of data exported from multiple data ports are a same in the write data copy mode, defining the at least two groups of data as a category; generating an identification signal that is used to indicate a data copy; transmitting one group of data in the category to an interface of a memory array; and disconnecting a transmission path between a data port corresponding to another group of data in the category and another interface of the memory array, wherein the memory array, in response to the write-copy enable signal and the identification signal, copies the one group of data in the category to the another interface that is of the memory array and that corresponds to the another group of data in the category.

BRIEF DESCRIPTION OF THE DRAWINGS

One or more embodiments are exemplified by corresponding accompanying drawings, and these exemplified descriptions do not constitute a limitation on the embodiments. Components with the same reference numerals in the accompanying drawings are denoted as similar components, and the accompanying drawings are not limited by scale unless otherwise specified.

DETAILED DESCRIPTION

To resolve the issues mentioned in the background, a solution is required to reduce power consumption in writing data to a storage system.

The analyses show that the interface specifications for storage devices provide a write data copy mode. In this mode, if multiple groups of data to be written to a storage device are the same, only one group of data in the multiple groups of data is transmitted to an interface of a memory array of the storage device. A transmission path for transmitting another group of data in the multiple groups of data to another interface of the memory array is still activated. In addition, a special instruction is sent to the memory array to indicate a copy of written data. After receiving the special instruction, the memory array copies the group of normally transmitted data to the another interface that is of the memory array and that corresponds to the another group of data so as to write complete data to the memory array.

However, the transmission path for transmitting the another group of data to the another interface of the memory array is still activated. This still causes power consumption in data writing.

The embodiments of the present disclosure provide a storage system and a data writing method thereof. In a write data copy mode, if finding that multiple groups of data to be written to the memory array include groups of same data, the storage system activates a transmission path for one group of same data to be written to the storage system, but disconnects a transmission path for another group of same data to be written to the storage system. In this way, no additional power consumption is required on the transmission path for the another group of same data during the data writing process. Therefore, power consumption in writing data to the storage system can be reduced.

The embodiments of the present disclosure are described in detail below with reference to the drawings. Those skilled in the art should understand that many technical details are proposed in the embodiments of the present disclosure to make the present disclosure better understood. However, even without these technical details and various changes and modifications made based on the following embodiments, the technical solutions claimed in the embodiments of the present disclosure may still be realized.

Figure 1:
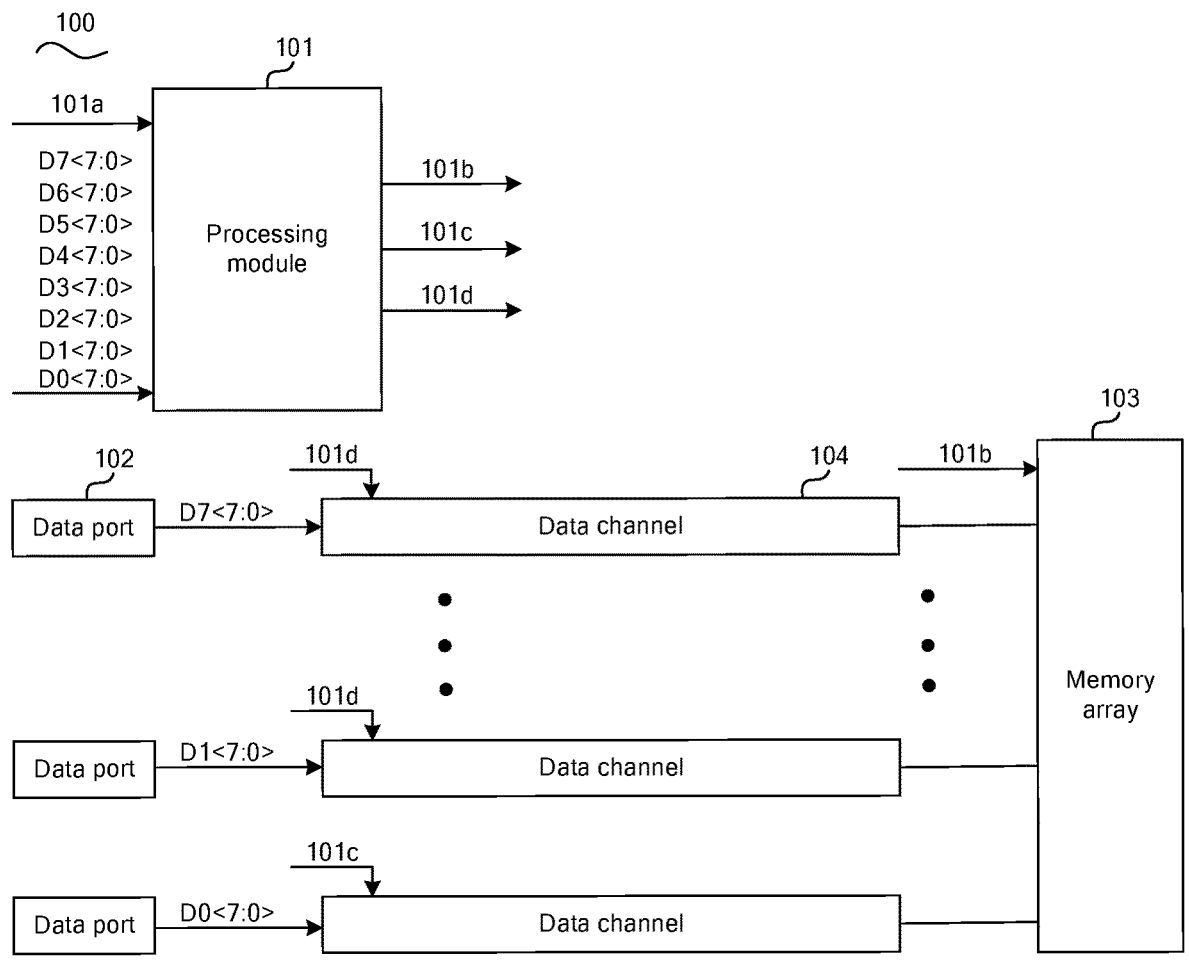
FIG. 1 is a first schematic diagram of a functional structure of a storage system according to an embodiment of the present disclosure.
Figure 2:
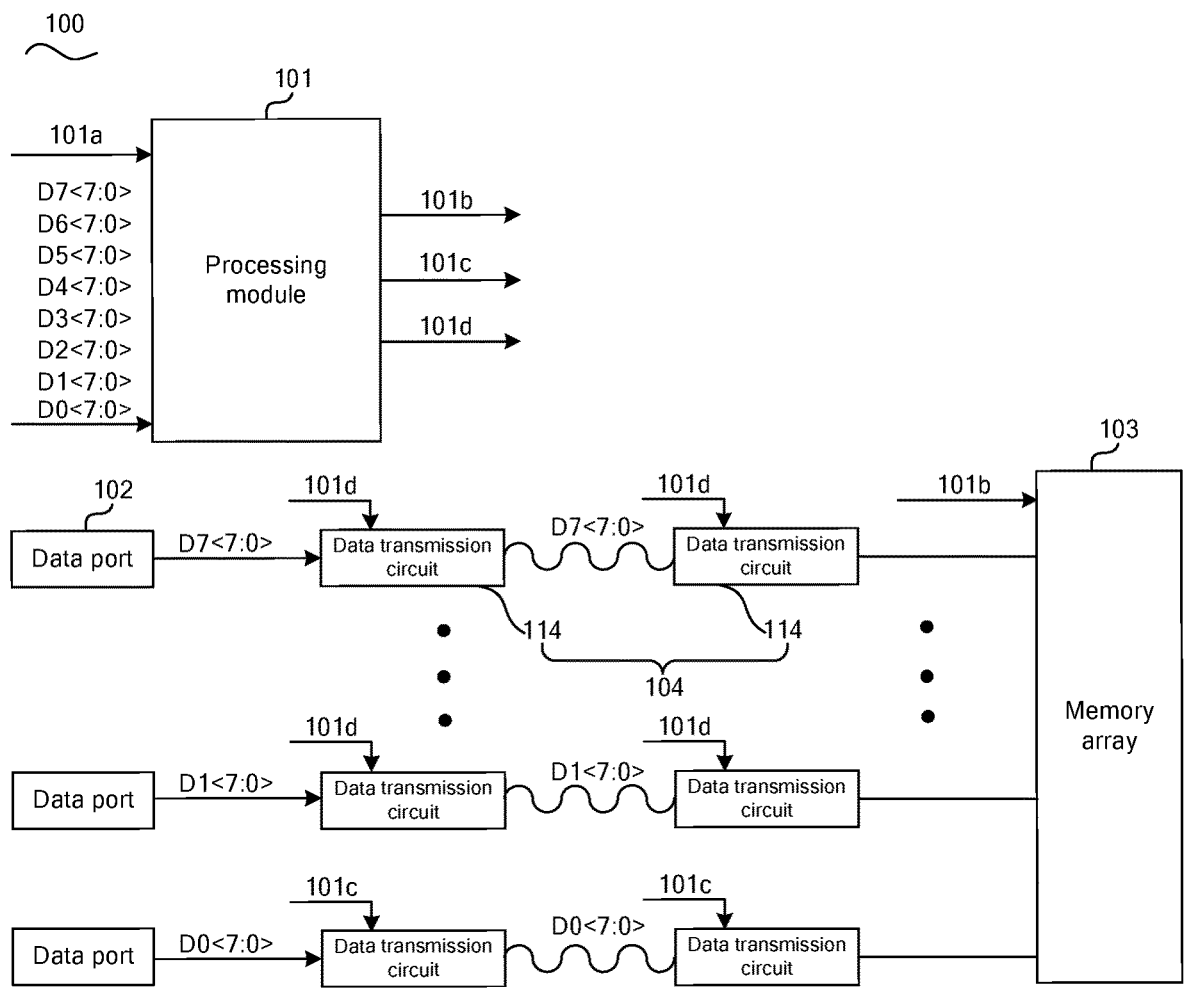
FIG. 2 is second schematic diagram of a functional structure of a storage system according to an embodiment of the present disclosure.
Figure 3:
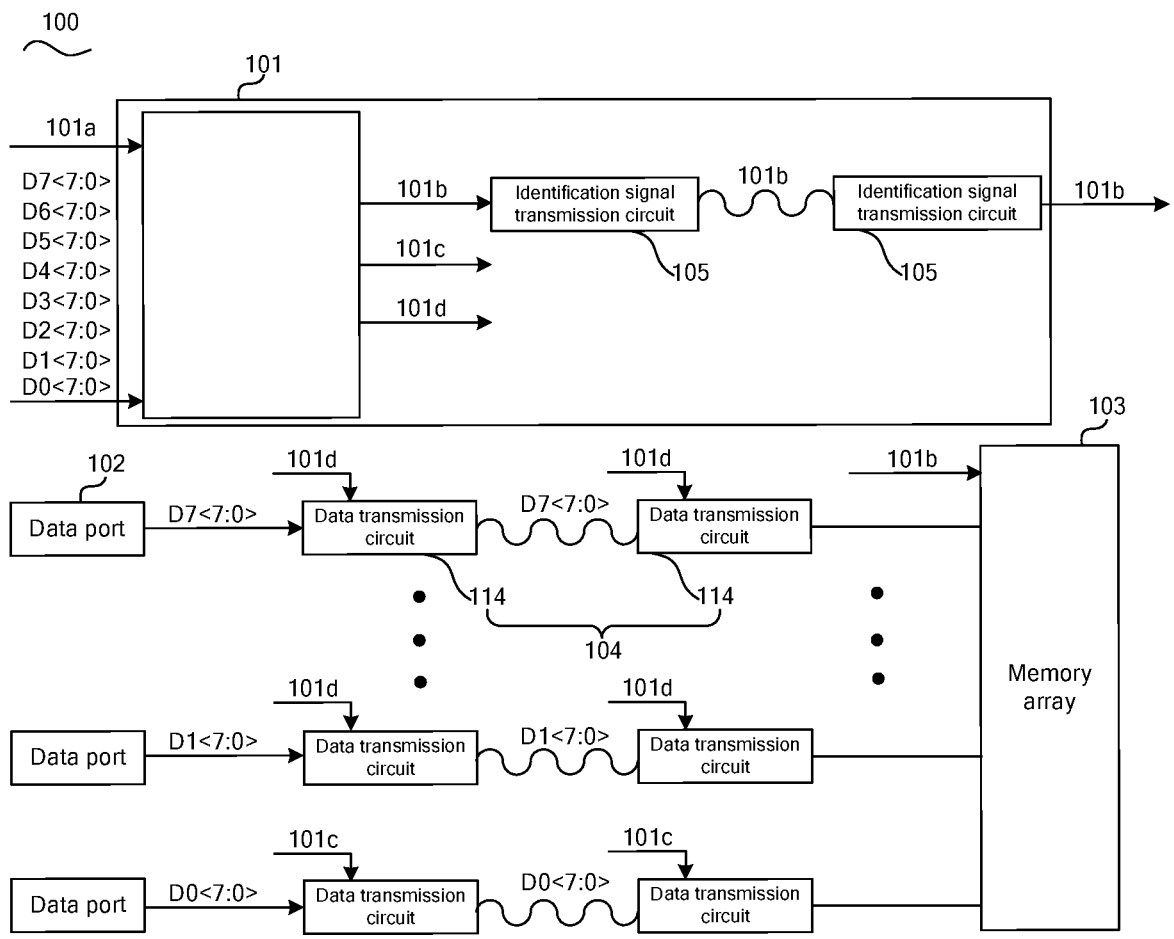
FIG. 3 is a third schematic diagram of a functional structure of a storage system according to an embodiment of the present disclosure.
Figure 4:
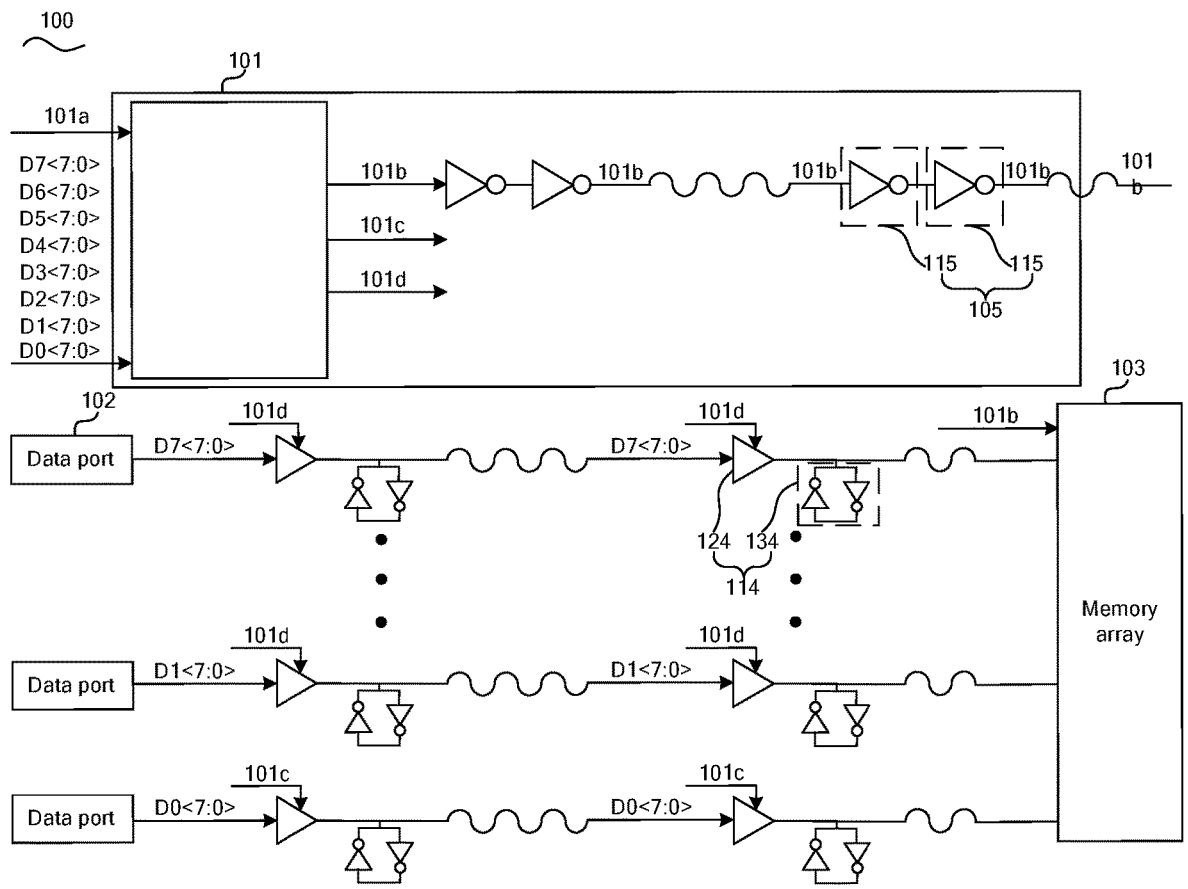
FIG. 4 is a fourth schematic diagram of a functional structure of a storage system according to an embodiment of the present disclosure.
Figure 5:
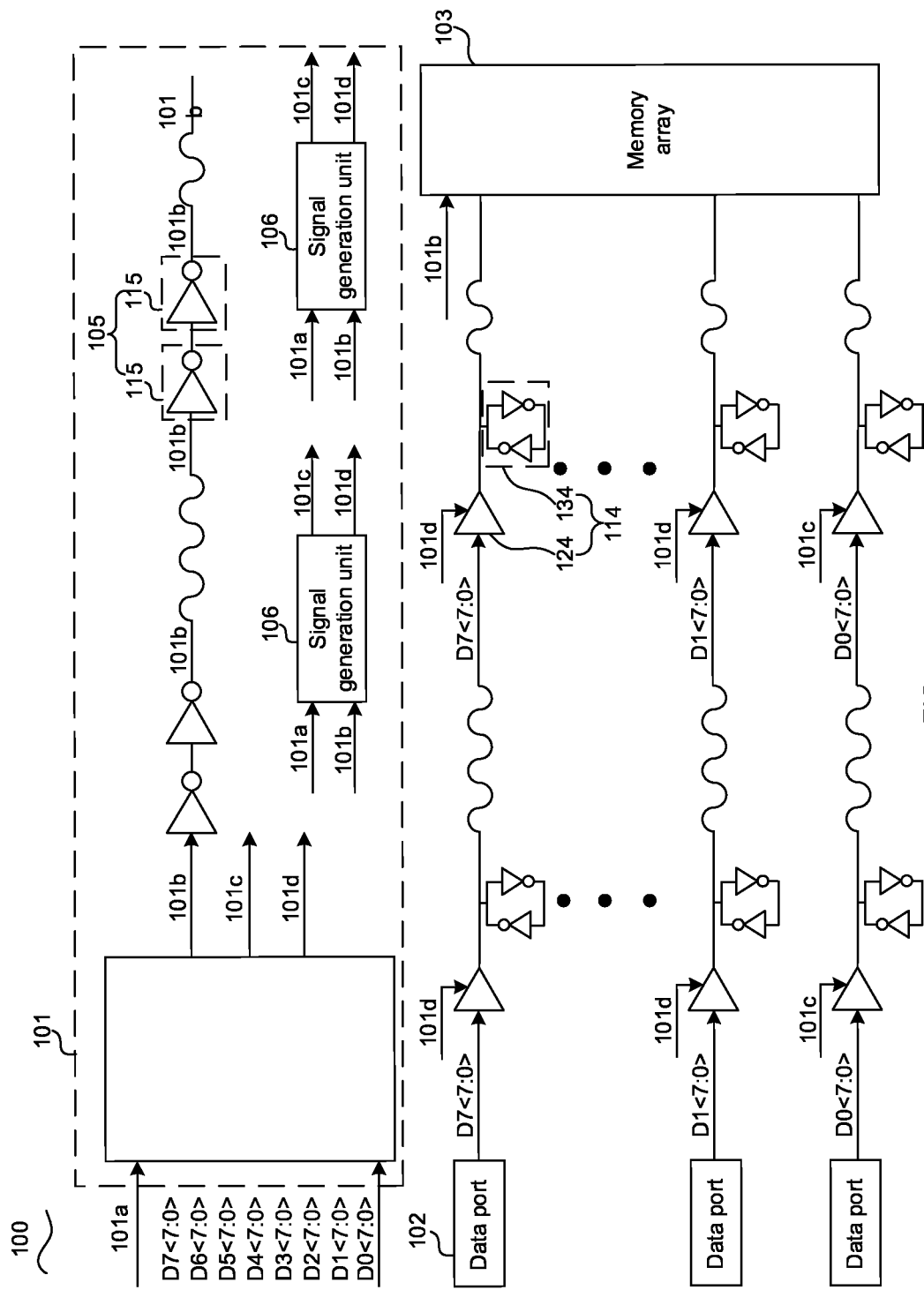
FIG. 5 is a fifth schematic diagram of a functional structure of a storage system according to an embodiment of the present disclosure.
Figure 6:
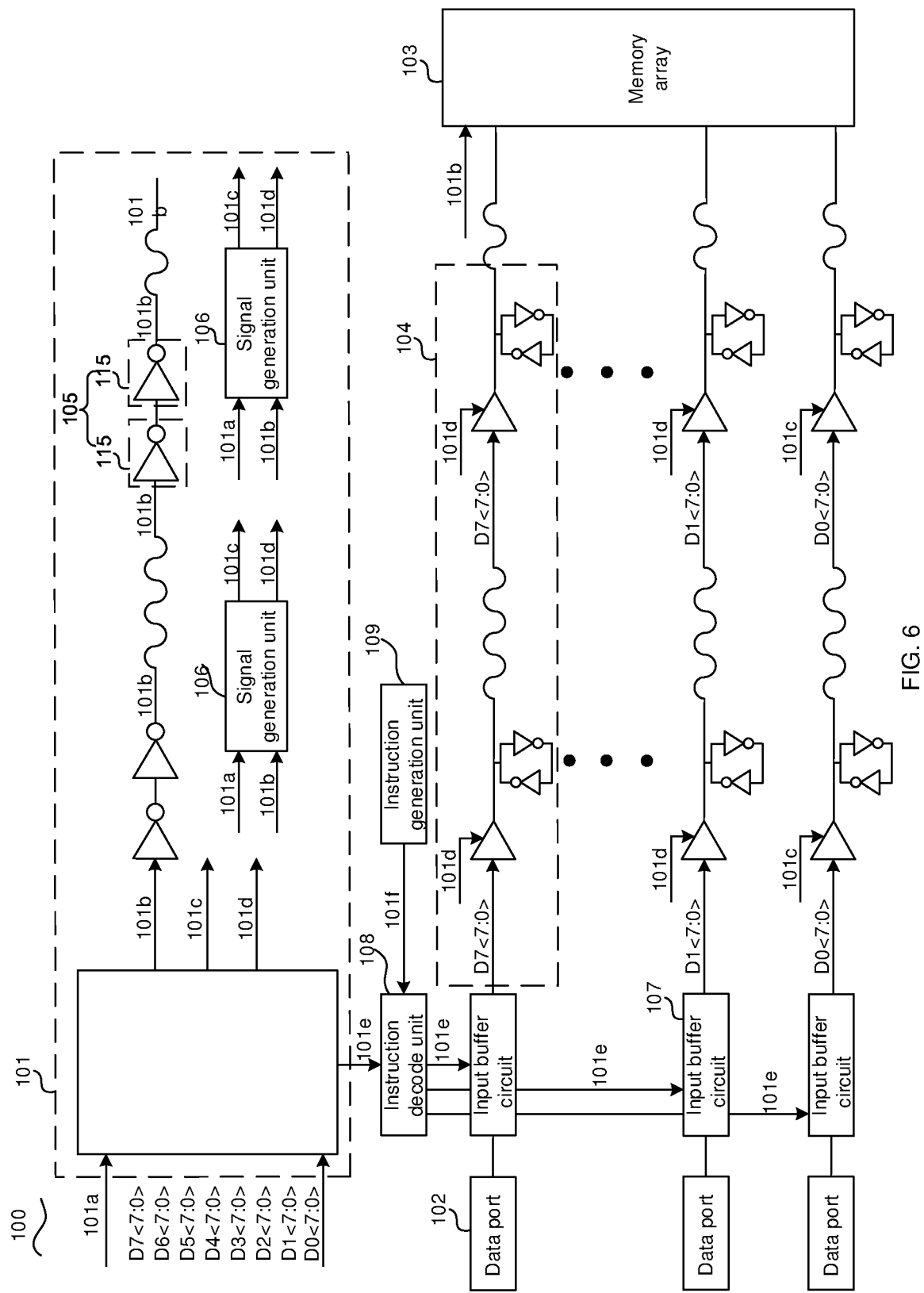
FIG. 6 is a sixth schematic diagram of a functional structure of a storage system according to an embodiment of the present disclosure.

A first embodiment of the present disclosure provides a storage system. The storage system provided by the embodiment of the present disclosure is described in detail below with reference to the drawings. FIG. 1 is a first schematic diagram of a functional structure of a storage system according to an embodiment of the present disclosure. FIG. 2 is second schematic diagram of a functional structure of a storage system according to an embodiment of the present disclosure. FIG. 3 is a third schematic diagram of a functional structure of a storage system according to an embodiment of the present disclosure. FIG. 4 is a fourth schematic diagram of a functional structure of a storage system according to an embodiment of the present disclosure. FIG. 5 is a fifth schematic diagram of a functional structure of a storage system according to an embodiment of the present disclosure. FIG. 6 is a sixth schematic diagram of a functional structure of a storage system according to an embodiment of the present disclosure.

In the embodiments of the present disclosure, referring to FIG. 1, a storage system 100 is configured to: enter a write data copy mode in response to a write-copy enable signal 101*a*; if at least two groups of data in multiple groups of data exported from multiple data ports 102 are the same in the write data copy mode, define the at least two groups of data as a category; generate an identification signal 101*b* that is used to indicate a data copy; transmit one group of data in the category to an interface of a memory array 103; and disconnect a transmission path between a data port 102 corresponding to another group of data in the category and another interface of the memory array 103. The memory array 103, in response to the write-copy enable signal 101*a* and the identification signal 101*b*, copies the one group of data in the category to the another interface that is of the memory array 103 and that corresponds to the another group of data in the category.

In some embodiments, still referring to FIG. 1, the data ports 102 may export the following eight groups of data: D0<7:0>, D1<7:0>, D2<7:0>, D3<7:0>, D4<7:0>, D5<7:0>, D6<7:0>, and D7<7:0>. Each of the eight groups of data includes an eight-bit unsigned number. If any two groups of data are the same, eight-bit unsigned numbers in the two groups of data have the same sequence. It should be noted that, in FIG. 1, that eight groups of data are exported from the data ports 102 and that each group of data includes an eight-bit unsigned number are merely examples. In actual application, the number of groups of data exported from the data ports 102 and the number of bits for an unsigned number in each group of data are not limited.

If at least two groups of data, such as D0<7:0> and D1<7:0>, in the eight groups of data are the same, the storage system can define D0<7:0> and D1<7:0> as a category, export an identification signal 101*b* that is used to indicate a data copy, transmit D0<7:0> to a corresponding interface of the memory array 103, and disconnect a transmission path for transmitting D1<7:0> to a corresponding interface of the memory array 103. In this way, no additional power consumption is caused on the transmission path for transmitting D1<7:0> to the corresponding interface of the memory array 103. Therefore, power consumption in writing data to the memory array 103 can be reduced.

The following uses two types of embodiments to describe how to write data to the memory array 103.

In some embodiments, the storage system 100 may be further configured to export the identification signal 101*b* if all of the multiple groups of data are the same. For example, D0<7:0>, D1<7:0>, D2<7:0>, D3<7:0>, D4<7:0>, D5<7:0>, D6<7:0>, and D7<7:0> are the same. Therefore, the storage system 100 can activate a transmission path for transmitting any group of data in the eight groups of data to the corresponding interface of the memory array 103, but disconnect transmission paths for transmitting the other seven groups of data to the corresponding interfaces of the memory array 103. For example, the any group of data is D0<7:0> and the other seven groups of data are D1<7:0>, D2<7:0>, D3<7:0>, D4<7:0>, D5<7:0>, D6<7:0>, and D7<7:0>. This prevents unnecessary power consumption on the transmission paths corresponding to the other seven groups of data when the eight groups of data are the same. Therefore, power consumption in writing data to the memory array 103 can be reduced.

It should be noted that, in actual application, N groups of data may be exported from the data ports 102 and all of the N groups of data may be the same. In this case, unnecessary power consumption on N−1 transmission paths corresponding to N−1 groups of data can be prevented during the transmission of the N groups of data. Therefore, power consumption in writing data to the memory array 103 is reduced. N is an integer greater than or equal to 2.

In some other embodiments, the storage system 100 may be further configured to: if the multiple groups of data have at least one group of data whose data is different from that in the category, transmit the at least one group of data to a corresponding interface of the memory array 103.

For example, in D0<7:0>, D1<7:0>, D2<7:0>, D3<7:0>, D4<7:0>, D5<7:0>, D6<7:0>, and D7<7:0>, the former six groups of data are the same but different from D6<7:0> and D7<7:0>, wherein D7<7:0> is different from D6<7:0>. In other words, the eight groups of data are classified into three different categories. In this case, the storage system 100 transmits data in D0<7:0>, D6<7:0>, and <7:0> to interfaces that are of the memory array 103 and that correspond to D0<7:0>, D6<7:0>, and <7:0> respectively. Therefore, three transmission paths are activated to transmit the data in D0<7:0>, D6<7:0>, and <7:0> so as to write the data in D0<7:0>, D6<7:0>, and <7:0> to the memory array 103. Meanwhile, the other five transmission paths are disconnected so as to prevent unnecessary power consumption in writing data to the memory array 103.

In addition, D0<7:0>, D1<7:0>, D2<7:0>, D3<7:0>, D4<7:0>, and D5<7:0> are the same. Therefore, the activation of a transmission path for transmitting any of these six groups of data to a corresponding interface of the memory array 103 can meet the requirements in actual application. For ease of description, a transmission path for transmitting D0<7:0> to an interface that is of the memory array 103 and that corresponds to D0<7:0> is activated.

It should be noted that the foregoing example is used only for easy description. In actual application, data transmission can be implemented based on the foregoing solution if the multiple groups of data have at least one group of data whose data is different from that in the category. For example, in D0<7:0>, D1<7:0>, D2<7:0>, D3<7:0>, D4<7:

0>, D5<7:0>, D6<7:0>, and D7<7:0>, the former four groups of data are the same and the latter four groups of data are the same. D0<7:0> is different from D4<7:0>. In other words, the eight groups of data are classified into two different categories. In this case, the storage system 100 can transmit data in D0<7:0> to the interface that is of the memory array 103 and that corresponds to D0<7:0> and data in D4<7:0> to the interface that is of the memory array 103 and that corresponds to D4<7:0> based on the identification signal 101b. Therefore, the storage system 100 can disconnect the remaining six transmission paths based on the identification signal 101b so as to prevent unnecessary power consumption in writing data to the memory array 103.

In addition, D0<7:0>, D1<7:0>, D2<7:0>, and D3<7:0> are the same. Therefore, the activation of a transmission path for transmitting any of these groups of data to a corresponding interface of the memory array 103 can meet the requirements in actual application. For ease of description, the transmission path for transmitting D0<7:0> to the interface that is of the memory array 103 and that corresponds to D0<7:0> is activated. D4<7:0>, D5<7:0>, D6<7:0>, and D7<7:0> are the same. Therefore, the activation of a transmission path for transmitting any of these groups of data to a corresponding interface of the memory array 103 can meet the requirements in actual application. For ease of description, the transmission path for transmitting D4<7:0> to the interface that is of the memory array 103 and that corresponds to D4<7:0> is activated.

It should be noted that the foregoing example is used only for easy description. In this example, the number of categories is 2, and the groups of data D0<7:0>, D1<7:0>, D2<7:0>, and D3<7:0> are the same. In actual application, other groups of data may be the same, and the same groups of data may include multiple consecutive groups of data or inconsecutive groups of data. This is not limited in the embodiments of the present disclosure. In addition, the number of categories may be greater than 2.

Still referring to FIG. 1, the storage system 100 in the embodiments of the present disclosure includes a processing component 101 and multiple data channels 104. The processing component 101 is configured to: in response to the write-copy enable signal 101a and the multiple groups of data, generate a first drive signal 101c, a second drive signal 101d, and the identification signal 101b, and send the identification signal 101b to the memory array 103. Each of the multiple data channels 104 is a transmission path for transmitting a group of data between an interface of the memory array 103 and a data port 102. The data channel 104 corresponding to one group of data in the category is activated in response to the first drive signal 101c. The data channel 104 corresponding to the another group of data in the category is disconnected in response to the second drive signal 101d.

A data channel 104 for any group of data in the category is selected and activated by receiving the first drive signal 101c, and the data channel 104 for the another group of data in the category is disconnected by receiving the second drive signal 101d. In this way, when multiple groups of same data are transmitted, the first drive signal 101c can be used to control the activation of only one data channel 104, and the second drive signal 101d can be used to control the disconnection of the data channel 104 corresponding to the another group of data in the multiple groups of same data. This prevents unnecessary power consumption on the transmission path corresponding to the another group of data in the multiple groups of same data. Therefore, power consumption in writing data to the memory array 103 is further reduced.

In some embodiments, referring to FIG. 2, the data channel 104 may include multiple data transmission circuits 114 that are serially connected, and each stage of the multiple data transmission circuits 114 transmits data based on the first drive signal 101c or is disconnected based on the second drive signal 101d.

When data is transmitted from the data port 102 to the interface of the memory array 103, data distortion is prone to occur because the data channel 104 is long. In other words, data that is exported from the data port 102 becomes different when the data is transmitted to the interface of the memory array 103. As a result, an error may occur when data is written to the memory array 103. Therefore, the data channel 104 includes multiple data transmission circuits 114 that are serially connected. This helps ensure that data to be transmitted on the data channel 104 is processed by each data transmission circuit 114 and is transmitted without distortion.

Referring to FIG. 3, the processing component 101 may further include multiple identification signal transmission circuits 105 that are serially connected. Each identification signal transmission circuit 105 has an input terminal configured to receive the identification signal 101b and an output terminal configured to export the identification signal 101b. A last identification signal transmission circuit 105 is configured to transmit the identification signal 101b to the memory array 103.

When the identification signal 101b is transmitted from the processing component 101 to the memory array 103, data distortion is also prone to occur because the transmission path is long. In other words, the identification signal 101b that is exported from the processing component 101 becomes different when the identification signal 101b is transmitted to the memory array 103. As a result, the identification signal 101b may be misread by the memory array 103. Consequently, the memory array 103 may have difficulty in determining, based on the identification signal 101b, whether a data copy occurs among the multiple data groups that are written to the memory array 103 and which groups of data are the same. Therefore, the processing component 101 includes multiple identification signal transmission circuits 105 that are serially connected. This helps ensure that the identification signal 101b exported from the processing component 101 is processed by each identification signal transmission circuit 105 and is transmitted to the memory array 103 without distortion.

In some embodiments, referring to FIG. 4, each identification signal transmission circuit 105 may include an even number of serially connected inverters 115. The inverter 115 features relatively high noise tolerance, extremely high input resistance, and extremely low static power consumption, and is insensitive to noise and interference. In addition, an even number of serially connected inverters 115 ensure that the identification signal 101b that is finally transmitted to the memory array 103 is not inverted. Therefore, the identification signal 101b can be less affected when being transmitted from the processing component 101 to the memory array 103. This further ensures that the identification signal 101b is transmitted to the memory array 103 without distortion.

In some embodiments, still referring to FIG. 4, the data transmission circuit 114 may include a driver 124 and a latch 134. The driver 124 activates the data transmission circuit 114 in response to the first drive signal 101c or disconnects the data transmission circuit 114 in response to the second drive signal 101d. In this way, after the driver 124 activates the data transmission circuit 114, data transmitted on the data transmission circuit 114 is divided into two parts. One part is transmitted to the latch 134 and is latched. The other part is transmitted to a next data transmission circuit 114.

It should be noted that, in FIG. 2 to FIG. 4, two data transmission circuits 114 that are serially connected are provided on the data channel 104. This is merely an example. In actual application, the number of data transmission circuit 114 on the data channel 104 is not limited. In FIG. 3 and FIG. 4, two identification signal transmission circuits 105 that are serially connected are provided. In actual application, the number of identification signal transmission circuits 105 is not limited.

In some embodiments, referring to FIG. 5, the processing component 101 may further include multiple signal generation units 106. Each signal generation unit 106 corresponds to one identification signal transmission circuit 105 and one data transmission circuit 114 and is configured to: in response to the write-copy enable signal 101a and the identification signal 101b received by an input terminal of the identification signal transmission circuit 105, provide the first drive signal 101c and the second drive signal 101d to the corresponding data transmission circuit 114.

The identification signal 101b can be used to indicate a data copy, that is, to indicate which groups of data are the same. Therefore, the signal generation unit 106 can generate, based on the identification signal 101b received by the input terminal of the identification signal transmission circuit 105, a new first drive signal 101c for a next data transmission circuit 114 that needs to transmit data, and a new second drive signal 101d for a next data transmission circuit 114 whose previous data transmission circuit 114 resides on a disconnected data channel 104. This ensures that data to be transmitted on the data channel 104 is processed by each data transmission circuit 114 and is transmitted without distortion. This also ensures that each data transmission circuit 114 on the data channel 104 corresponding to the another group of data in the category is disconnected. Therefore, no interference is caused to data transmission, and power consumption in writing data to the memory array 103 is reduced.

In some embodiments, referring to FIG. 6, the storage system 100 may further include multiple input buffer circuits 107. Each input buffer circuit 107 is located between a data channel 104 and a data port 102, and the input buffer circuit 107 corresponding to the another group of data in the category is disconnected in response to a disconnect enable signal 101e that is exported from the processing component 101. In this way, the input buffer circuit 107 is disconnected when receiving the disconnect enable signal 101e. In other words, the input buffer circuit 107 corresponding to the another group of data in the category is not driven and data exported from the data port 102 will not be transmitted on the data channel 104. The data channel 104 corresponding to the disconnected input buffer circuit 107 is also disconnected based on the second drive signal 101d. In this way, no additional power consumption is caused on the transmission path for transmitting the another group of data in the category from the input buffer circuit 107 to the corresponding interface of the memory array 103. Therefore, power consumption in writing data to the memory array 103 can be reduced.

Still referring to FIG. 6, the processing component 101 may further include an instruction decode unit 108. The instruction decode unit 108 is connected to each input buffer circuit 107 and is configured to: export the disconnect enable signal 101e to the input buffer circuit 107 corresponding to the another group of data in the category based on an instruction signal 101f and the disconnect enable signal 101e. In this way, the instruction decode unit 108 can export the disconnect enable signal 101e to the input buffer circuit 107 corresponding to the another group of data in the category based on the instruction signal 101f so that the input buffer circuit 107 corresponding to the another group of data in the category is disconnected based on the disconnect enable signal 101e.

In some embodiments, still referring to FIG. 6, the storage system 100 may further include an instruction generation unit 109. The instruction generation unit 109 is configured to receive the multiple groups of data and export the instruction signal 101f if the multiple groups of data include the category.

It should be noted that the instruction generation unit 109 can be used to analyze the multiple groups of data that need to be transmitted from the data ports 102. In some examples, the instruction signal 101f generated based on the multiple groups of data can be used to indicate that the multiple groups of data include the category and indicate which group of data in the category can be transmitted. In addition, the instruction signal 101f can also be used to indicate a position of an input buffer circuit 107 corresponding to each group of data. In this way, the instruction decode unit 108 can subsequently transmit, based on the instruction signal 101f, the disconnect enable signal 101e to the input buffer circuit 107 corresponding to the another group of data in the category. The input buffer circuit 107 corresponding to the another group of data in the category can be disconnected based on the disconnect enable signal 101e, and the transmission path between the input buffer circuit 107 and the corresponding interface of the memory array 103 can also be disconnected. In other examples, if the number of categories is greater than or equal to 2, the instruction signal 101f generated based on the multiple groups of data can be used to indicate that specific groups of data exported from specific data ports 102 belong to the same category, and indicate a position of an input buffer circuit 107 corresponding to each group of data. In this way, the instruction decode unit 108 can subsequently transmit, based on the instruction signal 101f, the disconnect enable signal 101e to an input buffer circuit 107 corresponding to a group of data that is in any of the categories and that does not need to be transmitted. This prevents the disconnect enable signal 101e from being misread by input buffer circuits 107 in different categories.

Therefore, the instruction generation unit 109 can be used to analyze the multiple groups of data to be transmitted by the data ports 102, so as to learn which groups of data in the multiple groups of data are the same and to obtain the instruction signal 101f that indicates a position of an input buffer circuit 107 corresponding to each group of data. In this way, an input buffer circuit 107 corresponding to another group of data in a category is disconnected, and the disconnect enable signal 101e is not misread by input buffer circuits 107 in different categories.

It should be noted that, in actual application, the instruction generation unit 109 can be a subunit of the processing component 101, a component in parallel with the processing component 101, or an external unit outside the storage system 100.

In some embodiments, the processing component 101 may be further configured to export a third drive signal (not shown in the figure) if the multiple groups of data include at least one group of data having different data, wherein the data channel 104 corresponding to the at least one group of data having different data is activated in response to the third drive signal.

In the multiple groups of data, some groups of data are the same, while other groups of data are different. The first drive signal 101*c* and second drive signal 101*d* are generated based on the same groups of data, and the third drive signal is generated based on the other groups of data that are different. This ensures that only one data channel 104 in the multiple data channels 104 corresponding to the same groups of data is activated to reduce power consumption in data transmission. This also ensures that the data channels 104 corresponding to the other groups of data that are different are activated based on the third drive signal. Therefore, the integrity of data finally written to the memory array 103 can be ensured.

It should be noted that the data channel 104 corresponding to the at least one group of data having different data can also be activated in response to the first drive signal 101*c* in actual application.

To sum up, in the write data copy mode, if finding that multiple groups of data to be written to the memory array 103 include same data, the storage system 100 activates a transmission path that is used to transmit one group of data in the category to the memory array 103 but disconnects a transmission path that is used to transmit another group of data in the category to the memory array 103. In this way, no additional power consumption is caused on the transmission path corresponding to the another group of data in the category in the data writing process. Therefore, power consumption in writing data to the memory array 103 can be reduced.

Another embodiment of the present disclosure further provides a data writing method of a storage system, which is applicable to the storage system provided in the foregoing embodiments. The data writing method of the storage system provided by the another embodiment of the present disclosure is described in detail below with reference to the drawings.

In the embodiments of the present disclosure, the data writing method of the storage system includes the following steps: Enter a write data copy mode in response to a write-copy enable signal. If at least two groups of data in multiple groups of data exported from multiple data ports are the same in the write data copy mode, define the at least two groups of data as a category. Generate an identification signal that is used to indicate a data copy. Transmit one group of data in the category to an interface of a memory array. Disconnect a transmission path between a data port corresponding to another group of data in the category and another interface of the memory array. The memory array, in response to the write-copy enable signal and the identification signal, copies the one group of data in the category to the another interface that is of the memory array and that corresponds to the another group of data in the category. In this way, no additional power consumption is caused on the transmission path for transmitting the another group of data in the category to the corresponding interface of the memory array. Therefore, power consumption in writing data to the memory array can be reduced.

In some embodiments, the step of generating an identification signal that is used to indicate a data copy may further include the following sub steps: Determine whether all of the multiple groups of data are the same. If all of the multiple groups of data are the same, generate the identification signal. In this way, if all of N groups of data are the same, the identification signal can be used to disconnect transmission paths corresponding to N−1 groups of data during the transmission of the N groups of data. This prevents unnecessary power consumption on the N−1 transmission paths corresponding to the N−1 groups of data. Therefore, power consumption in writing data to the memory array is reduced. N is an integer greater than or equal to 2.

In some embodiments, the step of transmitting one group of data in the category to an interface of a memory array and disconnecting a transmission path between a data port corresponding to another group of data in the category and another interface of the memory array may include the following sub steps: In response to the write-copy enable signal and the multiple groups of data, generate a first drive signal and a second drive signal. Transmit, by a data channel corresponding to the one group of data in the category, the one group of data to the corresponding interface of the memory array in response to the first drive signal. Disconnect a data channel corresponding to the another group of data in the category in response to the second drive signal.

In this way, when multiple groups of same data are transmitted, the first drive signal can be used to control the activation of only one data channel in data channels corresponding to the multiple groups of data, and the second drive signal can be used to control the disconnection of the data channel corresponding to the another group of data in the multiple groups of data. This can prevent unnecessary power consumption on the transmission path corresponding to the another group of data in the multiple groups of data. Therefore, power consumption in writing data to the memory array is further reduced. Subsequently, the identification signal can be used to copy the data that is transmitted on the activated data channel to the interface that is of the memory array and that corresponds to the another group of data in the multiple groups of data.

In some embodiments, the step of transmitting one group of data in the category to an interface of a memory array and disconnecting a transmission path between a data port corresponding to another group of data in the category and another interface of the memory array may further include the following sub step: Disconnect an input buffer circuit between the data port and the data channel that correspond to the another group of data in the category. The disconnection of the input buffer circuit means that the input buffer circuit corresponding to the another group of data in the category is not driven. Therefore, data exported from the data port cannot be transmitted to the corresponding data channel. Therefore, power consumption in writing data to the memory array can be reduced.

In some embodiments, the multiple groups of data to be transmitted from the data ports 102 can be analyzed so as to generate an instruction signal and a disconnect enable signal. Then, the disconnect enable signal can be exported to the input buffer circuit corresponding to the another group of data in the category based on the instruction signal and the disconnect enable signal. In some examples, the instruction signal can be used to indicate that the multiple groups of data include the category and indicate which group of data in the category can be normally transmitted. In this way, the disconnect enable signal can be subsequently exported to the input buffer circuit corresponding to the another group of data in the category based on the instruction signal. Then, the input buffer circuit corresponding to the another group of data in the category can be disconnected based on the disconnect enable signal, and the transmission path between the input buffer circuit and the corresponding interface of the memory array can also be disconnected. In other examples, if the number of categories is greater than or equal to 2, the instruction signal generated based on the multiple groups of data can be used to indicate that specific groups of data exported from specific data ports belong to the same category, and indicate a position of an input buffer circuit corresponding to each group of data. In this way, an instruction decode unit can subsequently transmit, based on the instruction signal, the disconnect enable signal to an input buffer circuit corresponding to a group of data that is in any of the categories and that does not need to be transmitted. This prevents the disconnect enable signal from being misread by input buffer circuits in different categories.

In some embodiments, the identification signal is transmitted to the memory array by using multiple identification signal transmission circuits that are serially connected, and a data channel includes multiple data transmission circuits that are serially connected. Each data transmission circuit corresponds to an identification signal transmission circuit. The step of transmitting one group of data in the category to an interface of a memory array and disconnecting a transmission path between a data port corresponding to another group of data in the category and another interface of the memory array may further include the following sub step: In response to the write-copy enable signal and the identification signal that is received by an input terminal of a current identification signal transmission circuit, generate the first drive signal that is used to drive at least a current data transmission circuit and the second drive signal that is used to disconnect the current data transmission circuit. This ensures that each data transmission circuit 114 on the data channel 104 that needs to transmit data is activated based on the first drive signal. Therefore, data is transmitted without distortion. This also ensures that each data transmission circuit 114 on the data channel 104 corresponding to the another group of data in the category is disconnected. Therefore, no interference is caused to data transmission, and power consumption in writing data to the memory array 103 is reduced.

To sum up, if finding that the multiple groups of data to be written to the memory array include same data after the storage system enters a write data copy mode in response to a write-copy enable signal, the storage system activates a transmission path that is used to transmit one group of data in the category to the memory array but disconnects a transmission path that is used to transmit another group of data in the category to the memory array. In this way, no additional power consumption is caused on the transmission path corresponding to the another group of data in the category in the data writing process. Therefore, power consumption in writing data to the memory array can be reduced.

Those skilled in the art can understand that the above implementations are specific embodiments for implementing the present disclosure. In practical applications, various changes may be made to the above embodiments in terms of form and details without departing from the spirit and scope of the embodiments of the present disclosure. Any person skilled in the art may make changes and modifications to the embodiments without departing from the spirit and scope of the present disclosure. Therefore, the protection scope of the present disclosure should be subject to the scope defined by the claims.

The invention claimed is:

1. A storage system, comprising:
a processor, configured to:
enter a write data copy mode in response to a write-copy enable signal,
define at least two groups of data in multiple groups of data exported from multiple data ports as a category in the write data copy mode when the at least two groups of data are the same,
generate an identification signal that is used to indicate a data copy, a first drive signal and a second drive signal in response to the write-copy enable signal and the multiple groups of data, and
send the identification signal to a memory array;
multiple data channels, wherein:
each of the multiple data channels is a transmission path for transmitting a group of data between an interface of multiple interfaces of the memory array and a data port of the multiple data ports;
a data channel corresponding to one group of data in the category is activated in response to the first drive signal to transmit the one group of data in the category to one interface of the memory array; and
a data channel corresponding to another group of data in the category is disconnected in response to the second drive signal to disconnect a transmission path between a data port corresponding to the another group of data in the category and another interface of the memory array;
wherein the memory array, in response to the write-copy enable signal and the identification signal, copies the one group of data in the category to the another interface that is of the memory array and that corresponds to the another group of data in the category.

2. The storage system according to claim 1, wherein the processor is further configured to generate the identification signal when all of the multiple groups of data are the same.

3. The storage system according to claim 1, when the multiple groups of data have at least one group of data whose data is different from the data in the category, the multiple data channels are further configured to transmit the at least one group of data to a corresponding interface of the memory array.

4. The storage system according to claim 1, wherein each of the multiple data channels comprises:
multiple data transmission circuits that are serially connected, wherein each stage of the multiple data transmission circuits transmits data based on the first drive signal or is disconnected based on the second drive signal.

5. The storage system according to claim 4, wherein the processor comprises:
multiple identification signal transmission circuits that are serially connected, wherein each stage of the multiple identification signal transmission circuits has an input terminal configured to receive the identification signal and an output terminal configured to export the identification signal, and a last stage of the multiple identification signal transmission circuits is configured to transmit the identification signal to the memory array.

6. The storage system according to claim 5, wherein each stage of the multiple identification signal transmission circuits comprises an even number of serially connected inverters.

7. The storage system according to claim 4, wherein the processor is further configured to: when the multiple groups of data have at least one group of data whose data is different from the data in the category, export a third drive signal, wherein a data channel corresponding to the at least one group of data having different data is activated in response to the third drive signal.

8. The storage system according to claim 5, wherein the processor further comprises:

multiple signal generation units, wherein each of the multiple signal generation units corresponds to one of the multiple identification signal transmission circuits and one of the multiple data transmission circuits and is configured to: in response to the write-copy enable signal and the identification signal being received by the input terminal of one of the multiple identification signal transmission circuits, provide the first drive signal and the second drive signal to a corresponding one of the multiple data transmission circuits.

9. The storage system according to claim 1, further comprising:

multiple input buffer circuits, wherein each of the multiple input buffer circuits is located between a data channel and a data port, and an input buffer circuit of the multiple input buffer circuits corresponding to the another group of data in the category is disconnected in response to a disconnect enable signal that is exported from the processor.

10. The storage system according to claim 9, wherein the processor comprises:

an instruction decode unit, wherein the instruction decode unit is connected to each of the multiple input buffer circuits and is configured to: export the disconnect enable signal to the input buffer circuit corresponding to the another group of data in the category based on an instruction signal and the disconnect enable signal, wherein the instruction signal is generated when the multiple groups of data comprise the category.

11. The storage system according to claim 10, further comprising:

an instruction generation unit, wherein the instruction generation unit is configured to receive the multiple groups of data and export the instruction signal when the multiple groups of data comprise the category.

12. A data writing method of a storage system, comprising:

entering a write data copy mode in response to a write-copy enable signal;

defining at least two groups of data in multiple groups of data exported from multiple data ports as a category in the write data copy mode when the at least two groups of data are the same;

generating an identification signal that is used to indicate a data copy, a first drive signal and a second drive signal in response to the write-copy enable signal and the multiple groups of data;

transmitting, by a data channel corresponding to one group of data in the category, the one group of data in the category to an interface of multiple interfaces of a memory array in response to the first drive signal; and disconnecting a data channel corresponding to another group of data in the category in response to the second drive signal to disconnect a transmission path between a data port corresponding to the another group of data in the category and another interface of the memory array;

wherein the memory array, in response to the write-copy enable signal and the identification signal, copies the one group of data in the category to the another interface that is of the memory array and that corresponds to the another group of data in the category.

13. The data writing method according to claim 12, wherein the generating an identification signal that is used to indicate a data copy comprises:

determining whether all of the multiple groups of data are the same; and when all of the multiple groups of data are the same, generating the identification signal.

14. The data writing method according to claim 12, wherein the transmitting the one group of data in the category to an interface of multiple interfaces of a memory array and the disconnecting a transmission path between a data port corresponding to the another group of data in the category and another interface of the memory array further comprises:

disconnecting an input buffer circuit between the data port and the data channel that correspond to the another group of data in the category.

15. The data writing method according to claim 12, wherein the identification signal is transmitted to the memory array by using multiple identification signal transmission circuits that are serially connected, the data channel comprises multiple data transmission circuits that are serially connected, and each stage of the multiple data transmission circuits corresponds to one of the multiple identification signal transmission circuits; and the transmitting the one group of data in the category to an interface of multiple interfaces of a memory array and the disconnecting a transmission path between a data port corresponding to the another group of data in the category and another interface of the memory array further comprises:

in response to the write-copy enable signal and the identification signal that is received by an input terminal of a current identification signal transmission circuit, generating the first drive signal that is used to drive at least a current data transmission circuit and the second drive signal that is used to disconnect the current data transmission circuit.

\* \* \* \* \*